US011525357B2

(12) United States Patent
Chen et al.

(10) Patent No.: US 11,525,357 B2
(45) Date of Patent: Dec. 13, 2022

(54) UNLOADING TYPE SINKING RESCUE DEVICE OF SUBSEA MINING VEHICLE AND USE METHOD THEREOF

(71) Applicant: OCEAN UNIVERSITY OF CHINA, Qingdao (CN)

(72) Inventors: Xuguang Chen, Qingdao (CN); Xiaodong Niu, Qingdao (CN); Lizhen Wang, Qingdao (CN); Guangkun Lu, Qingdao (CN)

(73) Assignee: OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 17/728,996

(22) Filed: Apr. 26, 2022

(65) Prior Publication Data
US 2022/0251955 A1 Aug. 11, 2022

Related U.S. Application Data

(63) Continuation of application No. PCT/CN2021/083149, filed on Mar. 26, 2021.

(30) Foreign Application Priority Data

Feb. 2, 2021 (CN) .......................... 202110146028.6

(51) Int. Cl.
*E21C 50/00* (2006.01)
*B63C 11/52* (2006.01)
(Continued)

(52) U.S. Cl.
CPC ............ *E21C 50/00* (2013.01); *B62D 55/065* (2013.01); *B63B 21/50* (2013.01); *B63C 11/52* (2013.01)

(58) Field of Classification Search
CPC ....... E21C 50/00; B62D 55/065; B63B 21/50; B63B 21/24; B63C 11/52; B63C 11/00
See application file for complete search history.

(56) References Cited

U.S. PATENT DOCUMENTS 3,299,645 A * 1/1967 Link ....................... B63C 11/44
441/32
3,382,943 A * 5/1968 Anderson .............. B62D 55/24
305/152
(Continued)

FOREIGN PATENT DOCUMENTS

| CN | 109139016 A | 1/2019 |
| CN | 109398007 A | 3/2019 |

(Continued)

*Primary Examiner* — Carib A Oquendo
(74) *Attorney, Agent, or Firm* — Bayramoglu Law Offices LLC

(57) ABSTRACT

An unloading type sinking rescue device of a subsea mining vehicle and a use method thereof are provided. The unloading type sinking rescue device includes an assembly support, an unloading system, an ejection system and a control system. The assembly support is box-shaped, fixed to a subsea mining vehicle, and provided with a plurality of enclosed cavities. The unloading system includes a counterweight, a counterweight cable, a counterweight fixing bracket and a counterweight recovery cavity. The ejection system includes an anchor, an ejection cavity, an anchor cable, an anchor recovery shaft, a pulley, a spring and a boosting device. The control system controls the operation of the unloading system and the ejection system. The use method includes: (1) unloading; (2) ejection; (3) recovery of a part of counterweights; (4) recovery of the anchor; and (5) recovery of remaining counterweights.

10 Claims, 7 Drawing Sheets

(51) Int. Cl.
*B63B 21/50* (2006.01)
*B62D 55/065* (2006.01)

(56) References Cited

U.S. PATENT DOCUMENTS

| | | | | |
|---|---|---|---|---|
| 10,435,865 B2* | 10/2019 | Bonel | .................... | E02F 5/104 |
| 2005/0160959 A1* | 7/2005 | Roodenburg | ........... | B63B 27/36 |
| | | | | 114/258 |
| 2009/0140524 A1* | 6/2009 | Kejha | .................. | F03B 17/061 |
| | | | | 290/52 |
| 2013/0241263 A1* | 9/2013 | Jones | .................... | E02F 5/006 |
| | | | | 299/9 |
| 2013/0306524 A1 | 11/2013 | Welch | | |
| 2020/0208359 A1* | 7/2020 | Zhao | .................... | B62D 55/062 |
| 2020/0398958 A1* | 12/2020 | Gao | .................... | B62D 57/032 |
| 2022/0242532 A1* | 8/2022 | Power, III | ............... | B63B 73/30 |

FOREIGN PATENT DOCUMENTS

| | | | |
|---|---|---|---|
| CN | 110952984 A | 4/2020 | |
| CN | 110978917 A | 4/2020 | |
| CN | 111017058 A | 4/2020 | |
| CN | 111894594 A | 11/2020 | |
| FR | 2543071 A1 | 9/1984 | |

\* cited by examiner

UNLOADING TYPE SINKING RESCUE DEVICE OF SUBSEA MINING VEHICLE AND USE METHOD THEREOF

CROSS REFERENCE TO THE RELATED APPLICATIONS

This application is the continuation application of International Application No. PCT/CN2021/083149, filed on Mar. 26, 2021, which is based upon and claims priority to Chinese Patent Application No. 202110146028.6, filed on Feb. 2, 2021, the entire contents of which are incorporated herein by reference.

TECHNICAL FIELD

The present invention relates to subsea mining operation equipment, and more particularly, to an unloading type sinking rescue device of a subsea mining vehicle and a use method thereof.

BACKGROUND

The deep seabed contains abundant solid ore resources such as polymetallic nodules and cobalt crusts, with proven reserves reaching tens of billions of tons. The development of deep-sea mineral resources is an important direction to solve the problem of global resource and energy shortages.

In the harsh environment, the deep seabed polymetallic nodules resources are present in a surface distribution pattern, with an area of about 6-10 kg/m$^2$. They are scattered, and only present in the 0-25 cm soft soil surface of the seabed, which has low shear strength (0-6 kPa) and poor bearing capacity. When the front jet of the mining vehicle breaks the soil for mining, the thin and soft subsoil of the seabed is greatly disturbed, resulting in a significant drop in the bearing capacity of the soil. Since the mining vehicle has a large mass and generally relies on a large number of counterweights when diving, it is prone to sinking during the walking process. Different from the overall shear failure of the land, the subsidence failure of the bearing soil is similar to punching shear failure, which will cause sudden subsidence, causing the mining vehicle to stop working, thereby seriously affecting the mining efficiency. In addition, the deep-sea mining vehicle carries limited energy. In order to ensure the normal and long-lasting operation of the mining vehicle, it is necessary to reduce the energy consumption of the mining vehicle during the rescue process.

Chinese patent application 201710695314.1 discloses a walking chassis and a rescue method of a subsea mining vehicle. In this patent, a supporting device is designed to prop up the sinking mining vehicle to keep it away from the subsiding soil. A telescopic device is used to pull the mining vehicle forward and is retracted after the mining vehicle is taken away from the sinking area. In addition, crawler walking is combined with supporting stepping. However, the rescue process is complicated, and once the sinking area is excessively large, the rescue efficiency will be seriously affected. Furthermore, the energy consumption is large. Once multiple sinking accidents are encountered, a large amount of energy will be consumed, which, in severe cases, will lead to the stop of the mining vehicle due to energy shortages.

SUMMARY

An objective of the present invention is to provide an unloading type sinking rescue device of a subsea mining vehicle and a use method thereof. The present invention reduces the weight of a sinking subsea mining vehicle by unloading to rescue the subsea mining vehicle.

In order to solve the problems existing in the prior art, a first aspect of the present invention provides an unloading type sinking rescue device of a subsea mining vehicle, including an assembly support, an unloading system, an ejection system and a control system, where the assembly support is box-shaped, fixed to a subsea mining vehicle, and provided with a plurality of enclosed cavities; the unloading system, the ejection system and the control system are arranged on the assembly support;

the unloading system includes a counterweight, a counterweight cable, a counterweight fixing bracket and a counterweight recovery cavity; there are four counterweight recovery cavities arranged at four corners of the assembly support; the counterweight winding shaft and the counterweight fixing bracket are arranged in the counterweight recovery cavity; the counterweight winding shaft is connected to the counterweight through the counterweight cable; and the counterweight is configured to be stored in the counterweight recovery cavity;

the ejection system includes an anchor, an ejection cavity, an anchor cable, an anchor recovery shaft, a pulley, a spring and a boosting device; the anchor includes two anchor plates with built-in electromagnets, and includes an anchor controller; one ends of the two anchor plates are movably connected by an anchor shaft, and the anchor controller opens and closes the built-in electromagnets such that the two anchor plates rotate around the anchor shaft to open and close; the other ends of the two anchor plates are respectively provided with a barb, there are three ejection cavities, which are respectively arranged at front, left and right sides of the assembly support; the anchor recovery shaft, the spring and the boosting device are arranged in the ejection cavity; the anchor recovery shaft is connected to the anchor shaft on the anchor through the anchor cable; and the anchor is configured to be stored in the ejection cavity; and the control system controls the operation of the unloading system and the ejection system.

Preferably, the counterweight cable may be connected to the counterweight through a hook, which may be easy to change different counterweights.

Preferably, the counterweight may be a high-mass pressure-resistant object shaped as a large-bottomed cone.

Preferably, the counterweight fixing bracket may be composed of two semi-ring brackets, and may be controlled by an electromechanical device to operate; when the counterweight may be in a recovery state, the two semi-ring brackets may be closed to fix the counterweight; and when the counterweight may be thrown down, the two semi-ring brackets may be separated.

Preferably, the pulley may be provided at the edge of the ejection cavity to facilitate the closing of the anchor.

A second aspect of the present invention further provides a use method of the unloading type sinking rescue device of a subsea mining vehicle, including the following steps:

(1) unloading: the control system issues an instruction, such that the counterweight winding shafts in the counterweight cavities rotate respectively, and the counterweight fixing brackets are opened; the counterweight cables are subjected to a gravitational action of the counterweights and driven by the counterweight winding shafts to extend downward; due to a weak soil strength in a sinking area, the counterweights sink below a soil surface until an equilibrium state; the counterweight cables continuously extend for a certain distance to ensure that the counterweight cables with high strength are in a slack state, and a length equivalent to a floating distance of the mining vehicle is reserved; as designed, due to the downward throwing of the counterweights, a gravity of the mining vehicle equipped with the rescue device is reduced, and buoyancy of the mining vehicle is greater than the gravity thereof, such that the mining vehicle moves upward to escape the sinking area; and when the mining vehicle rises to a certain height, the counterweight cables enter a stretched state, and the mining vehicle is in a new equilibrium state under the buoyancy, the gravity and a cable tension;

(2) ejection: a detection system detects data, and determines a direction for the mining vehicle to move in, and the anchors at different positions are determined to be ejected; the control system issues an instruction to release the anchor cables of a corresponding ejection cavity; the anchor is ejected in the direction to move in under the action of an elastic force, and inserted into soil in the direction to move in to complete the ejection; and the anchor is in a closed state;

(3) recovery of a part of counterweights: according to the direction to move in, the counterweight at a corresponding position is recovered;

(4) recovery of the anchor: the anchor ejected in step (2) is recovered; when the anchor leaves the soil, the built-in electromagnets in the anchor are controlled by the control system to allow the anchor plates to rotate around the anchor shaft to be in an open state; during the recovery of the anchor, due to a reaction force of the anchor pulling out of the soil and a reaction force of water to the anchor in the open state, the mining vehicle generates an initial velocity in the direction to move in; when the anchor reaches the edges of the ejection cavity, the anchor is gradually closed under a constraint of the edges of the ejection cavity; and the anchor compresses the springs under the tension of the anchor cables, and is recovered and fixed in the ejection cavity; and (5) recovery of remaining counterweights: the remaining counterweights are recovered while the anchor is recovered; due to the gravity of the mining vehicle greater than the buoyancy, plus the initial velocity generated in step (4) in the direction to move in, the mining vehicle makes an oblique downward motion like a horizontal projectile motion; and the mining vehicle finally leaves the sinking area and falls on a soil layer in the direction to move in, thereby achieving the sinking rescue of the mining vehicle.

Preferably, in step (2), different anchors may be ejected according to different directions for the mining vehicle to move in;

A. to move in front, left and right directions: if the soil in front of the sinking area has a satisfactory strength and the mining vehicle may be able to run normally in a front area, the mining vehicle may be allowed to move forward; the control system issues an instruction, such that the front ejection cavity 11 releases the anchor cables 12; the anchor 10 may be ejected to the area in front of the sinking area under the action of an elastic force, and may be inserted into the soil in the direction to move in to complete the ejection; and the anchor 10 may be in a closed state;

similarly, if the soil on a left side of the sinking area has a satisfactory strength, the left anchor may be ejected; and similarly, if the soil on a right side of the sinking area has a satisfactory strength, the right anchor may be ejected; and B. to move in front left and front right directions: if the soil on a front left side of the sinking area has a satisfactory strength and the mining vehicle may be able to run normally in a front left area, the mining vehicle may be allowed to move in the front left direction; the control system issues an instruction, such that the front and left ejection cavities 11 release the anchor cables 12; the anchors 10 may be respectively ejected to areas in front of and to the left of the sinking area under the action of an elastic force, and may be inserted into the soil to complete the ejection; and the anchors 10 may be in a closed state; and similarly, if the soil on a front right side of the sinking area has a satisfactory strength, the front and right anchors may be correspondingly ejected, as shown in FIG. 8.

Preferably, in step (3), different counterweights may be recovered according to different directions for the mining vehicle to move in;

A. to move in front, left and right directions: if the mining vehicle is to move forward, the two front counterweights may be correspondingly recovered; and when the front counterweights leave the soil surface, the gravity of a front part of the mining vehicle may be increased, and the mining vehicle may be tilted forward at an angle;

similarly, if the mining vehicle is to move in the left direction, the two left counterweights may be correspondingly recovered, and the mining vehicle may be tilted in the left direction at an angle; and similarly, if the mining vehicle is to move in the right direction, the two right counterweights may be correspondingly recovered, and the mining vehicle may be tilted in the right direction at an angle; and B. to move in front left and front right directions, if the mining vehicle is to move in the front left direction, the front and left counterweights may be correspondingly recovered; and when the front and left counterweights leave the soil surface, the gravity of a front left part of the mining vehicle may be increased, and the mining vehicle may be tilted in the front left direction at an angle; and similarly, if the mining vehicle is to move in the front right direction, the front and right counterweights may be correspondingly recovered, and the mining vehicle may be tilted in the front right direction at an angle.

The present invention has the following characteristics and beneficial effects:

1. The present invention reduces the weight of the sinking subsea mining vehicle by throwing away the counterweights of the mining vehicle, so as to rescue the subsea mining vehicle.

2. The present invention cleverly combines the unloading system and the ejection system, such that the mining vehicle can flexibly choose the direction of escape, thereby ensuring the continuous progress of mining work.

3. The present invention utilizes buoyancy during the escape process, which reduces energy consumption and greatly increases the working time of the mining vehicle.

Figure 1:
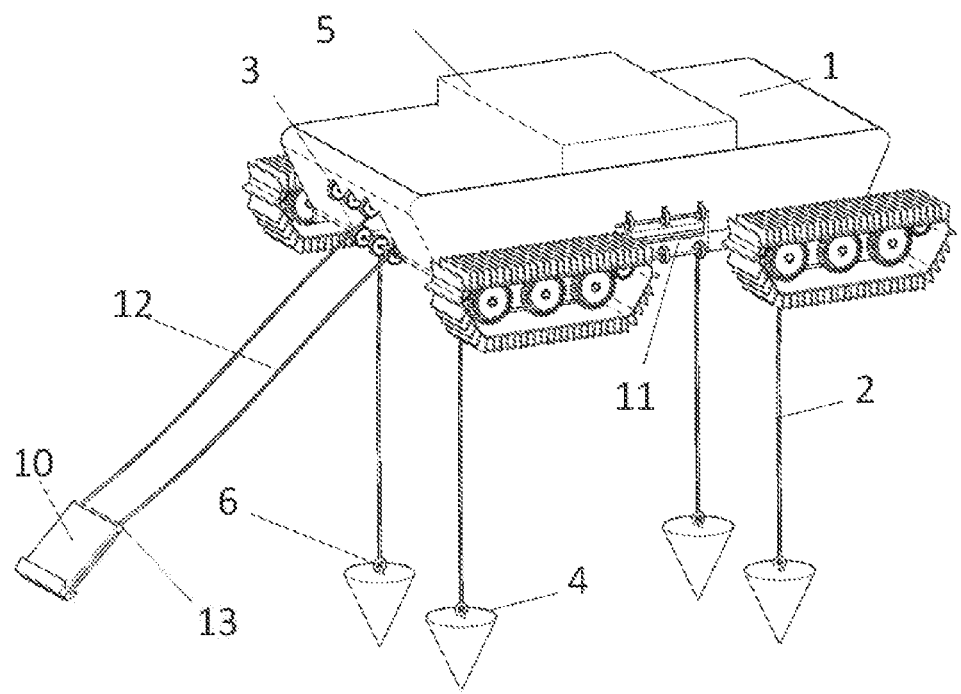
FIG. 1 is a full structural view of the present invention.
Figure 2:
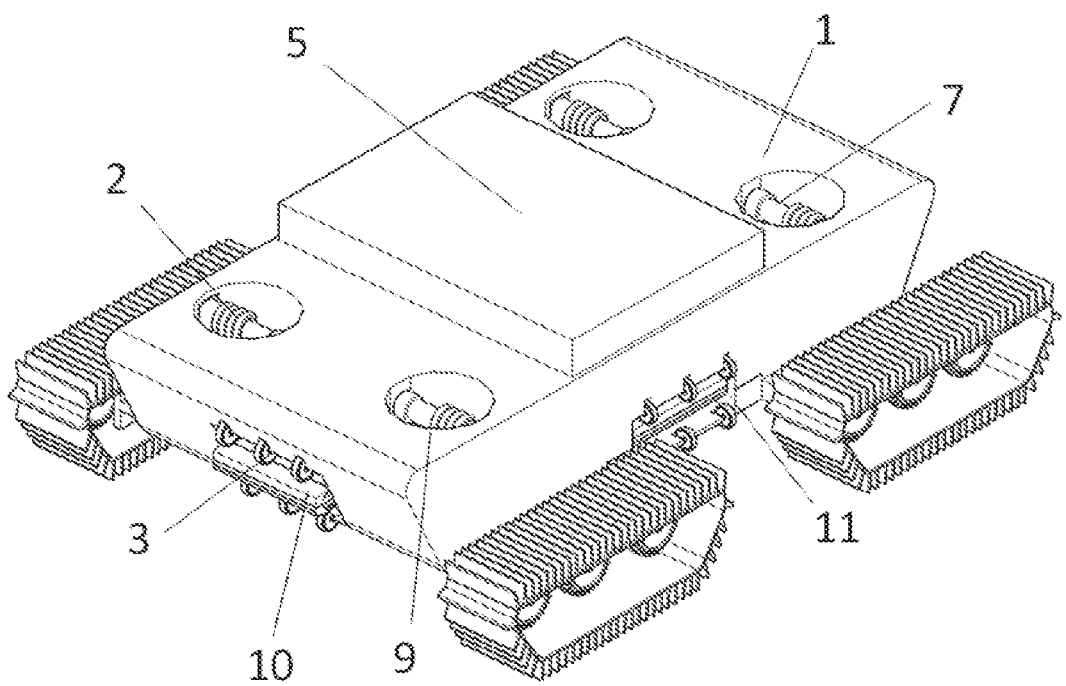
FIG. 2 is a partial structural view of the present invention.
Figure 3:
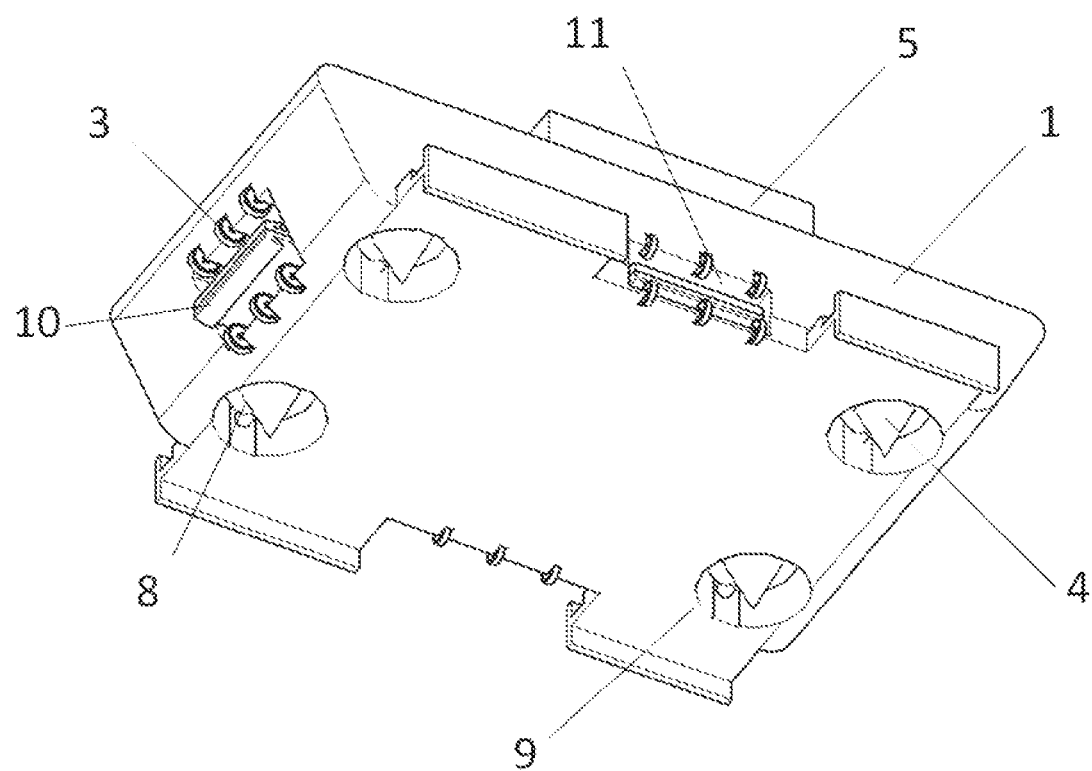
FIG. 3 is a bottom view of the present invention.
Figure 4:
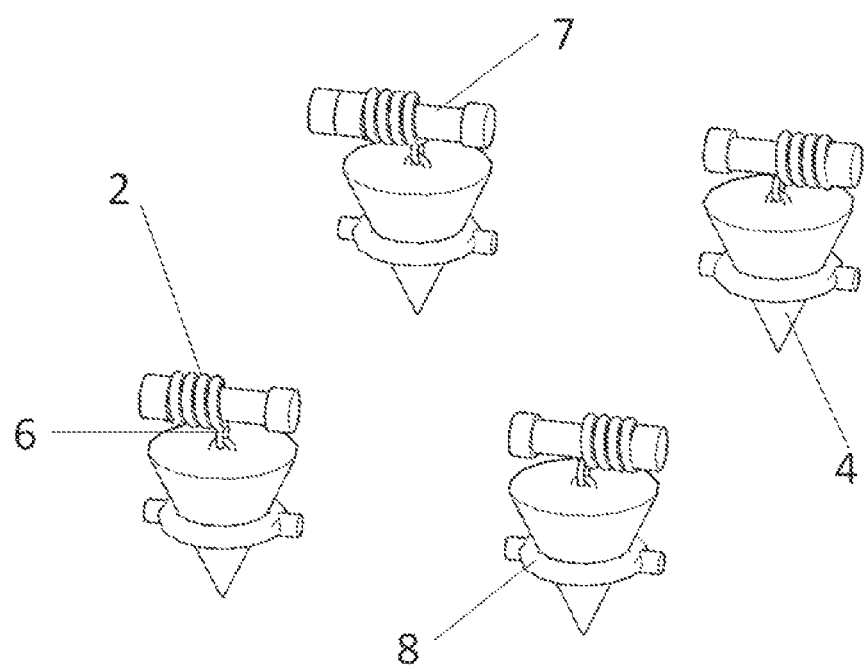
FIG. 4 is a structural view of an unloading system.
Figure 5:
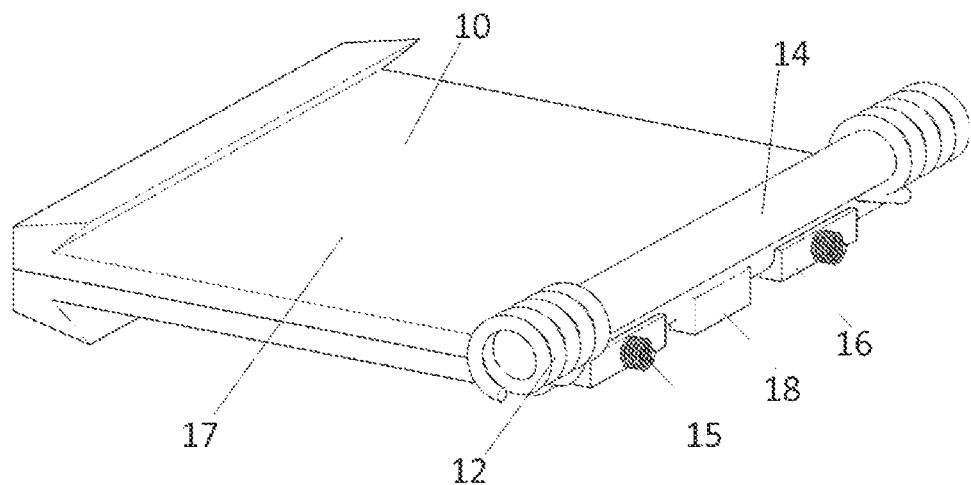
FIG. 5 is a structural view of an ejection system.
Figure 6:
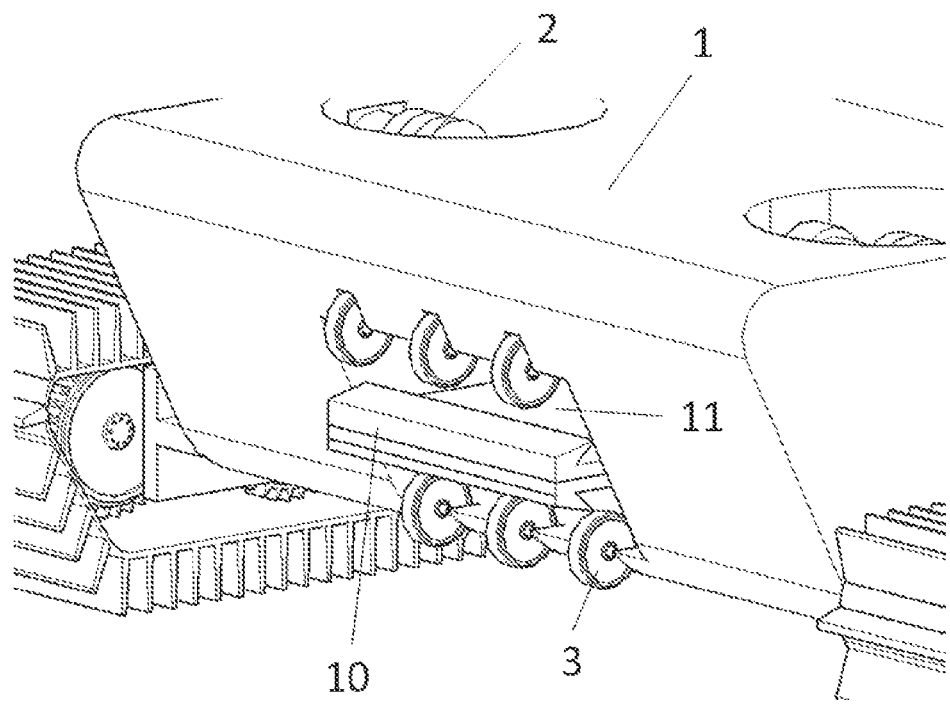
FIG. 6 shows an initial state of an anchor.

Reference Numerals: 1. assembly support; 2. counterweight cable; 3. pulley; 4. counterweight; 5. control system; 6. hook; 7. counterweight winding shaft; 8. counterweight fixing bracket; 9. counterweight recovery cavity; 10. anchor; 11. ejection cavity; 12. anchor cable; 13. anchor shaft; 14. anchor recovery shaft; 15. spring; 16. boosting device; 17. anchor plate; and 18. anchor controller.

DETAILED DESCRIPTION OF THE EMBODIMENTS

To facilitate a further understanding of the present invention, the present invention is described in detail below with reference to the preferred implementation schemes of the present invention.

Refer to FIGS. 1 to 7, an unloading type sinking rescue device of a subsea mining vehicle, including an assembly support 1, an unloading system, an ejection system and a control system 5. The assembly support 1 is box-shaped, fixed to a subsea mining vehicle, and provided with a plurality of enclosed cavities. The unloading system, the ejection system and the control system 5 are arranged on the assembly support.

The unloading system includes a counterweight 4, a counterweight cable 2, a counterweight fixing bracket 8 and a counterweight recovery cavity 9. There are four counterweight recovery cavities 9 arranged at four corners of the assembly support 1. The counterweight winding shaft 7 and the counterweight fixing bracket 8 are arranged in the counterweight recovery cavity 9. The counterweight winding shaft 7 is connected to the counterweight 4 through the counterweight cable 2. The counterweight cable 2 is connected to the counterweight 4 through a hook 6, which is easy to change different counterweights. The counterweight 4 is a high-mass pressure-resistant object shaped as a large-bottomed cone. A size of the counterweight is designed according to that of the counterweight recovery cavity 9 and is slightly less than that of the counterweight recovery cavity 9 so as to ensure normal recovery of the counterweight. The counterweight fixing bracket 8 is composed of two semi-ring brackets, and is controlled by an electromechanical device to operate. When the counterweight is in a recovery state, the two semi-ring brackets are closed to fix the counterweight. When the counterweight is thrown down, the two semi-ring brackets are separated.

The ejection system includes an anchor 10, an ejection cavity 11, an anchor cable 12, an anchor recovery shaft 14, a pulley 3, a spring 15 and a boosting device 16. The anchor 10 includes two anchor plates 17 with built-in electromagnets, and includes an anchor controller 18. One ends of the two anchor plates 17 are movably connected by an anchor shaft 13, and the anchor controller 18 opens and closes the built-in electromagnets such that the two anchor plates 17 rotate around the anchor shaft 13 to open and close. The other ends of the two anchor plates 17 are respectively provided with a barb. There are three ejection cavities 11, which are arranged at the midpoints of front, left and right lower parts of the assembly support for ejecting and storing the anchors 10. The anchor recovery shaft 14, the spring 15 and the boosting device 16 are arranged in the ejection cavity 11. The anchor recovery shaft 14 is connected to the anchor shaft 13 on the anchor 10 through the anchor cable 12. The anchor recovery shaft 14 rotates to pay off and take up the anchor cable 12 so as to control the picking and placing of the anchor 10. An ejection device in the ejection cavity 11 generates a thrust on the anchor 10 by compressing the spring 15 and the boosting device 16 to eject the anchor from the ejection cavity 11. The pulley 3 is provided at the edge of the ejection cavity 11 to reduce the closing resistance of the anchor 10.

The control system 5 controls the operation of the unloading system and the ejection system.

The rescue device of the present invention is used in combination with a subsea mining vehicle through the assembly support. The specifications of the rescue device vary according to the different designs of the subsea mining vehicle, such as the size of the cavities in the assembly support, the weight, number, and location of the counterweights and the anchors, which will not be repeated here.

When the subsea mining vehicle equipped with the rescue device of the present invention travels to a soft seabed soil surface, the soft seabed soil is damaged by punching shear, which causes the mining vehicle to sink and fail to travel normally. A sinking depth is determined through a sensor positioning system of the mining vehicle, and then the following rescue steps are implemented.

(1) Unloading: The control system 5 issues an instruction, such that the counterweight winding shafts 7 in the counterweight cavities rotate respectively around their axes, and the counterweight fixing brackets 8 are opened. The counterweight cables 2 are subjected to a gravitational action of the counterweights 4 and driven by the counterweight winding shafts 7 to extend downward until the counterweights 4 sink into a subsea mineral layer. Due to the weak soil strength in the sinking area, the counterweights 4 sink below the soil surface until an equilibrium state. The counterweight cables 2 continuously extend for a certain distance to ensure that the counterweight cables 2 with high strength are in a slack state, and a length equivalent to a floating distance of the mining vehicle is reserved. As designed, due to the downward throwing of the counterweights 4, a gravity of the mining vehicle equipped with the rescue device is reduced, and buoyancy of the mining vehicle is greater than the gravity thereof, such that the mining vehicle moves upward to escape the sinking area. When the mining vehicle rises to a certain height, the counterweight cables 2 enter a stretched state, and the mining vehicle is in a new equilibrium state under the buoyancy, the gravity and a cable tension.

(2) Ejection: A detection system detects data, and determines a direction for the mining vehicle to move in, and the anchors at different positions are determined to be ejected. The control system issues an instruction to release the anchor cables 12 of a corresponding ejection cavity 11. The anchor 10 is ejected in the direction to move in under the action of an elastic force, and inserted into the soil in the direction to move in to complete the ejection. At this time, the anchor 10 is in a closed state.

This step is described below according to different directions for the mining vehicle to move in.

A. To move in front, left and right directions: If the soil in front of the sinking area has a satisfactory strength and the mining vehicle is able to run normally in a front area, the mining vehicle is allowed to move forward. The control system issues an instruction, such that the front ejection cavity 11 releases the anchor cables 12. The anchor 10 is ejected to the area in front of the sinking area under the action of an elastic force, and is inserted into the soil in the direction to move in to complete the ejection. At this time, the anchor 10 is in a closed state.

Similarly, if the soil on a left side of the sinking area has a satisfactory strength, the left anchor is ejected.

Similarly, if the soil on a right side of the sinking area has a satisfactory strength, the right anchor is ejected.

B. To move in front left and front right directions: If the soil on a front left side of the sinking area has a satisfactory strength and the mining vehicle is able to run normally in a front left area, the mining vehicle is moved to the left front direction. The control system issues an instruction, the front and left ejection cavities 11 release the anchor cables 12; the anchors 10 are respectively ejected to areas in front of and to the left of the sinking area under the action of an elastic force, and are inserted into the soil to complete the ejection. At this time, the anchors 10 are in a closed state.

Figure 8:
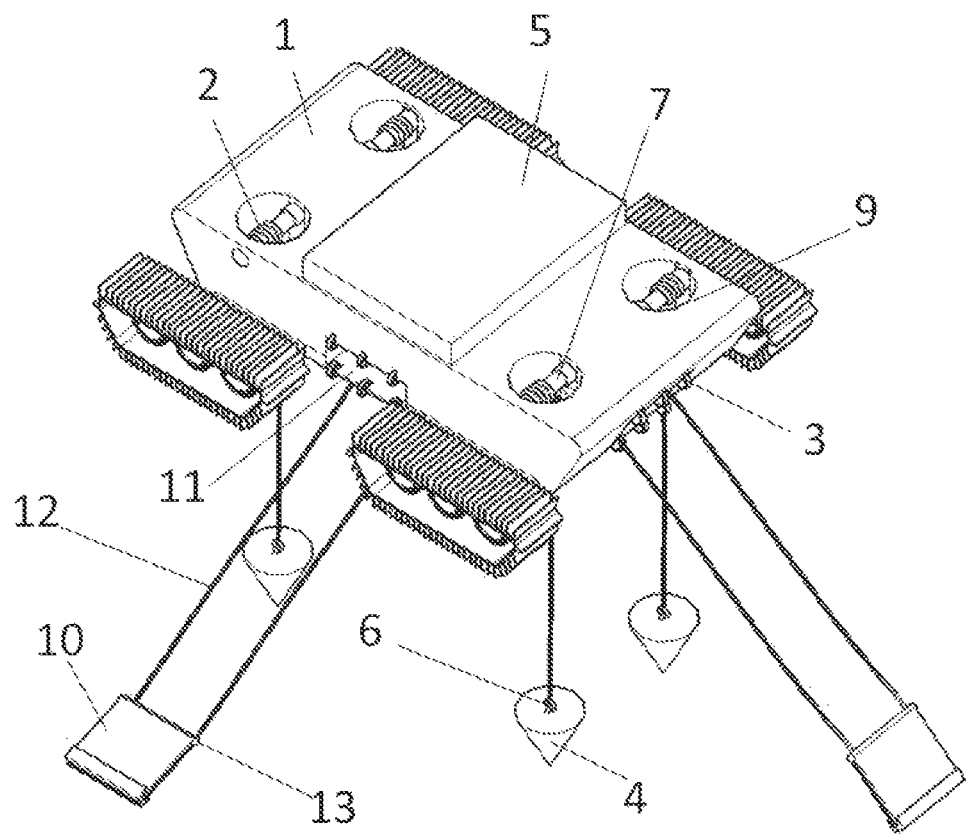
FIG. 8 shows ejection of front and right anchors.

Similarly, if the soil on a front right side of the sinking area has a satisfactory strength, the front and right anchors are correspondingly ejected, as shown in FIG. 8.

(3) Recovery of a part of counterweights: According to the direction to move in, the counterweight at a corresponding position is recovered.

This step is described below according to different directions for the mining vehicle to move in.

A. To move in front, left and right directions: If the mining vehicle is to move forward, the two front counterweights are correspondingly recovered. When the front counterweights leave the soil surface, the gravity of a front part of the mining vehicle is increased, and the mining vehicle is tilted forward at an angle.

Similarly, if the mining vehicle is to move in the left direction, the two left counterweights are correspondingly recovered, and the mining vehicle is tilted in the left direction at an angle.

Similarly, if the mining vehicle is to move in the right direction, the two right counterweights are correspondingly recovered, and the mining vehicle is tilted in the right direction at an angle.

B. To move in front left and front right directions: If the mining vehicle is to move in the front left direction, the front and left counterweights are correspondingly recovered. When the front and left counterweights leave the soil surface, the gravity of a front left part of the mining vehicle is increased, and the mining vehicle is tilted in the front left direction at an angle.

Similarly, if the mining vehicle is to move in the front right direction, the front and right counterweights are correspondingly recovered, and the mining vehicle is tilted in the front right direction at an angle.

Figure 9:
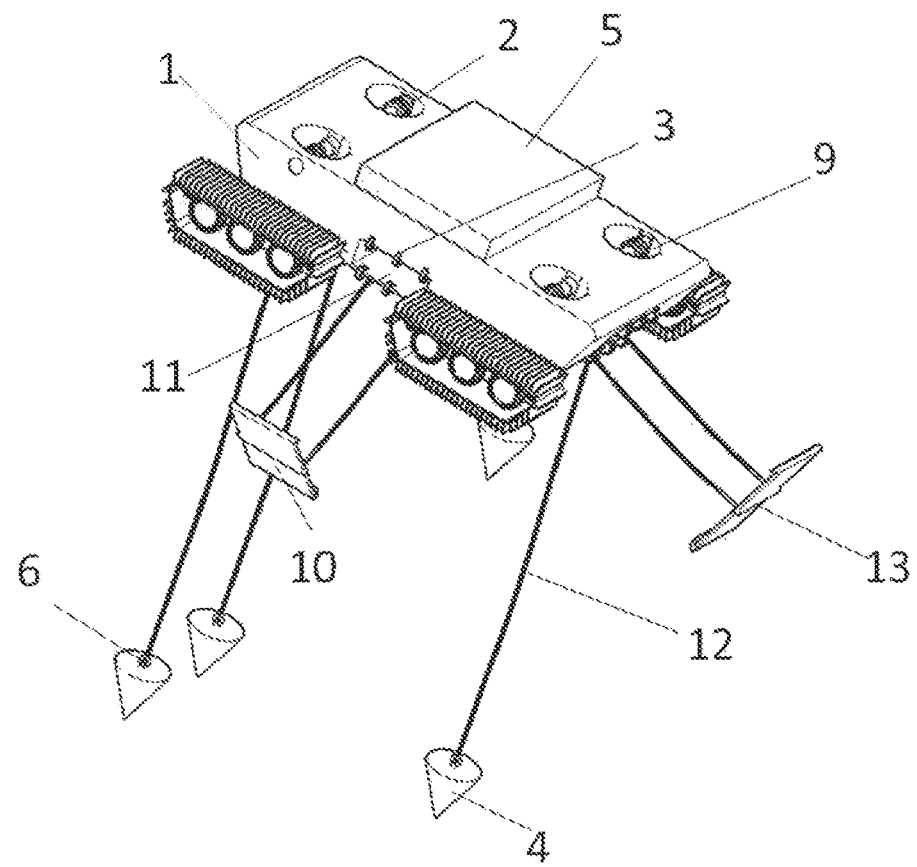
FIG. 9 shows recovery of front and right anchors.

(4) Recovery of the anchor: The anchors ejected in step (2) are recovered. When the anchors leave the soil, the built-in electromagnets in the anchors are controlled by the control system to allow the anchor plates to rotate around the anchor shafts to be in an open state. During the recovery of the anchor, due to a reaction force of the anchor pulling out of the soil and a reaction force of water to the anchor in the open state, the mining vehicle generates an initial velocity in the direction to move in. When the anchor reaches the edges of the ejection cavity, the anchor is gradually closed under a constraint of the edges of the ejection cavity. The pulley at the edge of the ejection cavity facilitates the closure of the anchor. The anchor compresses the springs under the tension of the anchor cables, and is recovered and fixed in the ejection cavity. FIG. 9 shows the recovery of the front and right anchors of the present invention.

(5) Recovery of remaining counterweights: The remaining counterweights are recovered while the anchor is recovered. Due to the gravity of the mining vehicle greater than the buoyancy, plus the initial velocity generated in step (4) in the direction to move in, the mining vehicle makes an oblique downward motion like a horizontal projectile motion. The mining vehicle finally leaves the sinking area and falls on a soil layer in the direction to move in, thereby achieving the sinking rescue of the mining vehicle.

The rescue process of the mining vehicle in the front direction is described with reference to drawings.

Figure 10:
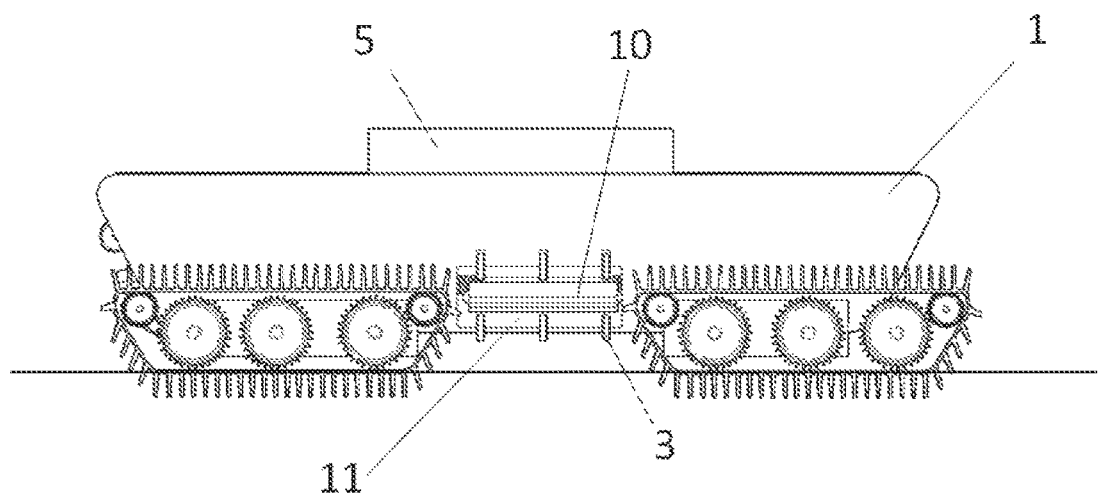
FIG. 10 shows normal walking of a mining vehicle.
Figure 11:
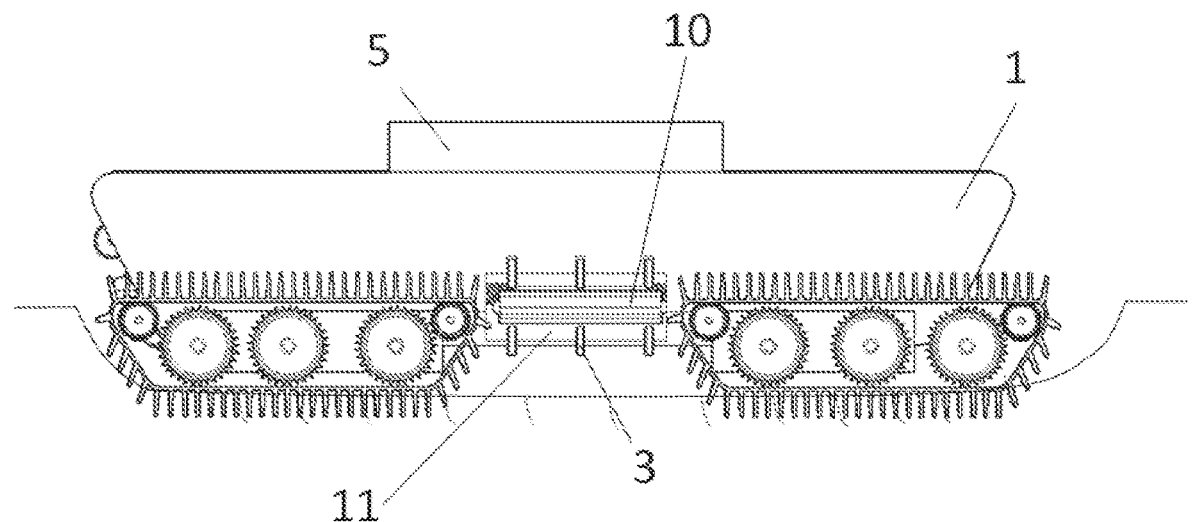
FIG. 11 shows a sinking state of the mining vehicle.

FIG. 10 shows that the mining vehicle runs normally in a flat area, and FIG. 11 shows that the mining vehicle sinks. The rescue steps of the mining vehicle are as follows:

(1) Unloading: The control system 5 issues an instruction, such that the counterweight winding shafts 7 in the counterweight cavities rotate respectively around their axes, and the counterweight fixing brackets 8 are opened. The counterweight cables 2 are subjected to a gravitational action of the counterweights 4 and driven by the counterweight winding shafts 7 to extend downward until the counterweights 4 sink into a subsea mineral layer. Due to the weak soil strength in the sinking area, the counterweights 4 sink below the soil surface until an equilibrium state. The counterweight cables 2 continuously extend for a certain distance to ensure that the counterweight cables 2 with high strength are in a slack state, and a length equivalent to a floating distance of the mining vehicle is reserved. As designed, due to the downward throwing of the counterweights 4, a gravity of the mining vehicle equipped with the rescue device is reduced, and buoyancy of the mining vehicle is greater than the gravity thereof, such that the mining vehicle moves upward to escape the sinking area. When the mining vehicle rises to a certain height, the counterweight cables 2 enter a stretched state, and the mining vehicle is in a new equilibrium state under the buoyancy, the gravity and a cable tension.

Figure 12:
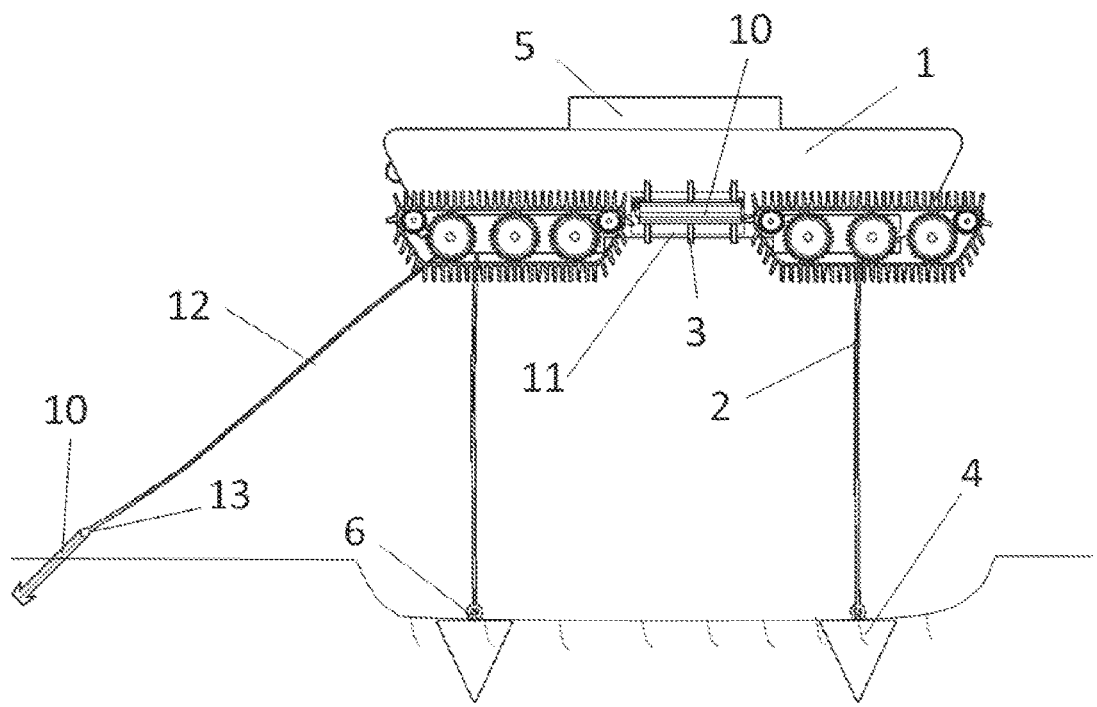
FIG. 12 shows a state after unloading and ejection are completed.

(2) The detection system detects data, and if the soil in front of the sinking area has a satisfactory strength and the mining vehicle is able to run normally in the direction, the mining vehicle is moved in the front direction. The control system issues an instruction, such that the front ejection cavity 11 releases the anchor cables 12. The anchor 10 is ejected to the front under the action of an elastic force and inserted into the soil in the direction to move in to complete the ejection. At this time, the anchor 10 is in a closed state. This state is shown in FIG. 12.

(3) Recovery of a part of counterweights: The two front counterweights are correspondingly recovered. When the front counterweights leave the soil surface, the gravity of a front part of the mining vehicle is increased, and the mining vehicle is tilted forward at an angle.

Figure 7:
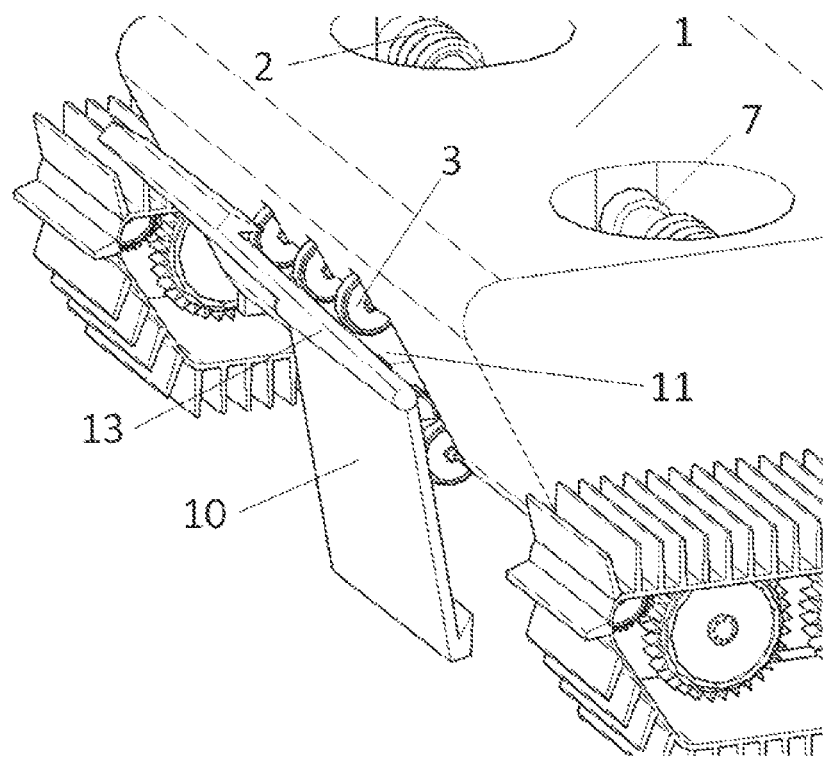
FIG. 7 shows an anchor in a recovery process.
Figure 13:
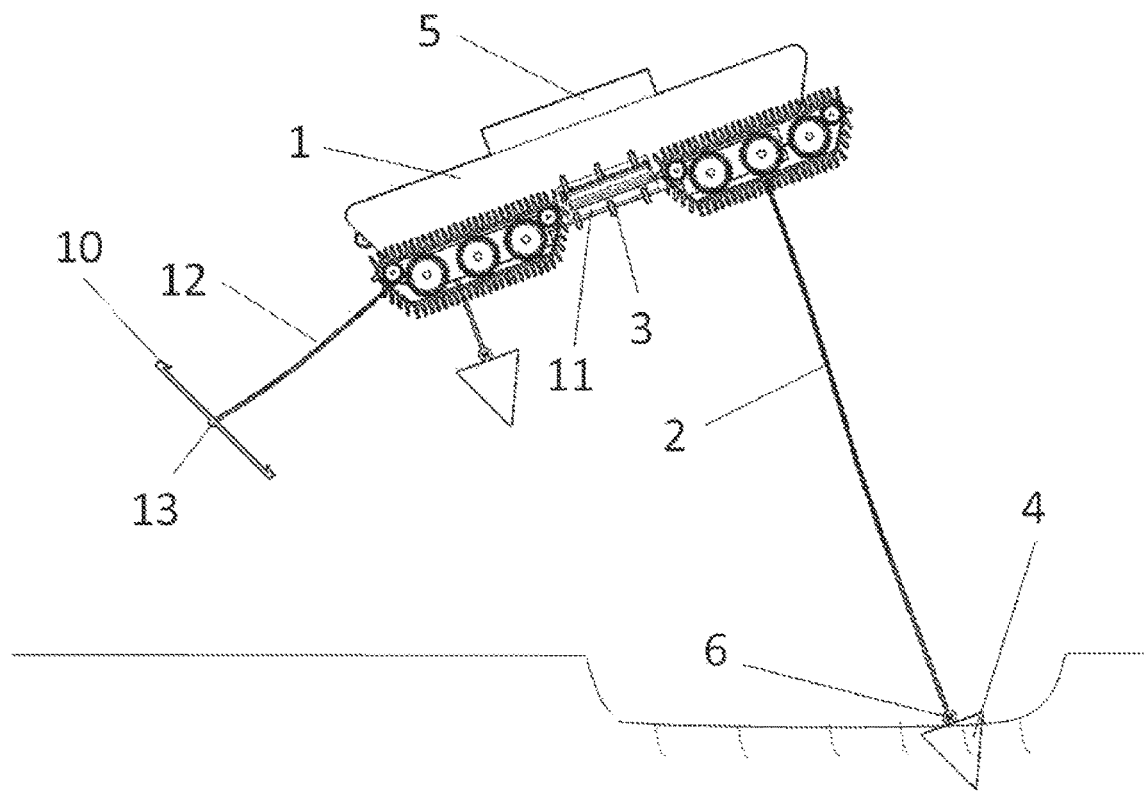
FIG. 13 shows recovery of a front counterweight and the front anchor.

(4) Recovery of the anchor. The front anchor 10 ejected in step (2) is recovered. When the anchor leaves the soil, the built-in electromagnets in the anchor are controlled by the control system to allow the anchor plates to rotate around the anchor shaft to be in an open state. During the recovery of the anchor, due to a reaction force of the anchor pulling out of the soil and a reaction force of water to the anchor in the open state, the mining vehicle generates an initial velocity in the front direction. This working state is shown in FIG. 13. As shown in FIG. 7, when the anchor reaches the edges of the ejection cavity, the anchor is gradually closed under a constraint of the edges of the ejection cavity. The pulley at the edge of the ejection cavity facilitate the closure of the anchor. The anchor squeezes the springs under the tension of the anchor cable, and is recovered and fixed in the ejection cavity.

Figure 14:
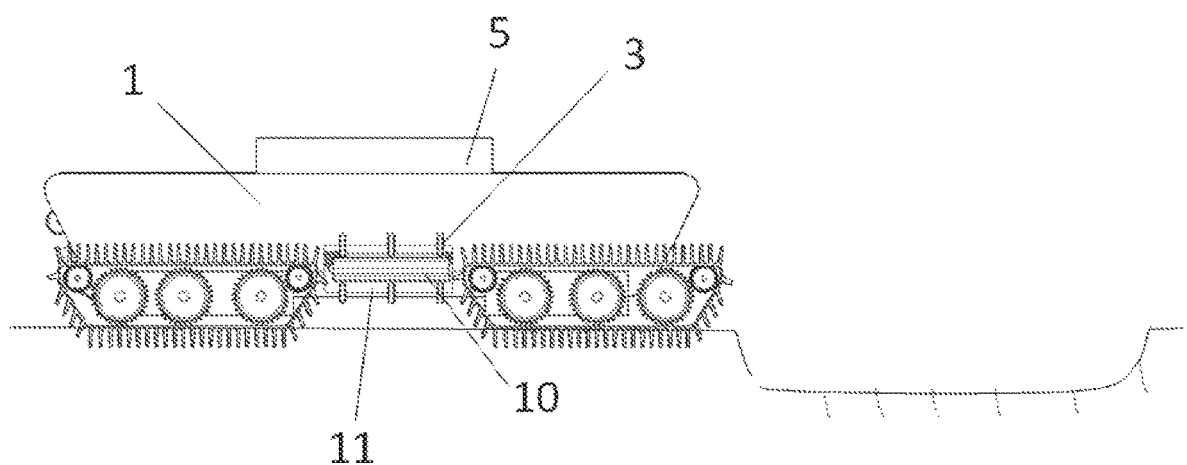
FIG. 14 shows a state that the mining vehicle is moved forward to be rescued.

(5) Recovery of remaining counterweights. The remaining counterweights are recovered while the anchor is recovered. Due to the gravity of the mining vehicle greater than the buoyancy, plus the initial velocity generated in step (4)

in the front direction, the mining vehicle makes an oblique downward motion like a horizontal projectile motion. The mining vehicle finally leaves the sinking area and falls on a front soil layer, thereby achieving sinking rescue of the mining vehicle, as shown in FIG. 14.

Although the present invention is described with reference to the preferred embodiments, the protection scope of the present invention is not limited there-to. Without departing from the scope of the present invention, various improvements can be made to the present invention and the components therein can be replaced with equivalents. The various technical features mentioned in the various embodiments can be combined in any manner in case of no structural conflict. Any reference numerals in the claims should not be regarded as limiting the involved claims, and the embodiments should be regarded as exemplary and non-restrictive from any point of view. Therefore, any technical solution falling within the scope of the claims is within the protection scope of the present invention.

What is claimed is:

1. An unloading type sinking rescue device of a subsea mining vehicle, comprising an assembly support, an unloading system, an ejection system and a control system; wherein
   the assembly support is box-shaped, fixed to the subsea mining vehicle, and provided with a plurality of enclosed cavities;
   the unloading system, the ejection system and the control system are arranged on the assembly support;
   the unloading system comprises a counterweight, a counterweight cable, a counterweight fixing bracket and a counterweight recovery cavity; wherein
      four counterweight recovery cavities are arranged at four corners of the assembly support;
      the counterweight winding shaft and the counterweight fixing bracket are arranged in the counterweight recovery cavity;
      the counterweight winding shaft is connected to the counterweight through the counterweight cable; and
      the counterweight is configured to be stored in the counterweight recovery cavity;
   the ejection system comprises an anchor, an ejection cavity, an anchor cable, an anchor recovery shaft, a pulley, a spring and a boosting device; wherein
      the anchor comprises two anchor plates and an anchor controller, wherein the two anchor plates are provided with built-in electromagnets;
      first ends of the two anchor plates are movably connected by an anchor shaft, and the anchor controller opens and closes the built-in electromagnets, wherein the two anchor plates rotate around the anchor shaft to open and close;
      second ends of the two anchor plates are respectively provided with a barb;
      three ejection cavities are respectively arranged at front, left and right sides of the assembly support;
      the anchor recovery shaft, the spring and the boosting device are arranged in the ejection cavity;
      the anchor recovery shaft is connected to the anchor shaft on the anchor through the anchor cable;
      the anchor is configured to be stored in the ejection cavity; and
      the pulley is provided at an edge of the ejection cavity; and
   the control system controls an operation of the unloading system and the ejection system.

2. The unloading type sinking rescue device according to claim 1, wherein
   the counterweight cable is connected to the counterweight through a hook.

3. The unloading type sinking rescue device according to claim 1, wherein
   the counterweight is a high-mass pressure-resistant object shaped as a large-bottomed cone.

4. The unloading type sinking rescue device according to claim 1, wherein
   the counterweight fixing bracket is composed of two semi-ring brackets.

5. A use method of the unloading type sinking rescue device according to claim 1, comprising the following steps:
   (1) unloading: the control system issues a first instruction, wherein the counterweight winding shafts in the counterweight cavities rotate respectively, and the counterweight fixing brackets are opened; the counterweight cables are subjected to a gravitational action of the counterweights and driven by the counterweight winding shafts to extend downward; due to a weak soil strength in a sinking area, the counterweights sink below a soil surface until an equilibrium state; the counterweight cables continuously extend for a certain distance to ensure that the counterweight cables with high strength are in a slack state, and a length equivalent to a floating distance of the subsea mining vehicle is reserved; as designed, due to a downward throwing of the counterweights, a gravity of the subsea mining vehicle equipped with the unloading type sinking rescue device is reduced, and buoyancy of the subsea mining vehicle is greater than the gravity of the subsea mining vehicle, wherein the subsea mining vehicle moves upward to escape the sinking area; and when the subsea mining vehicle rises to a certain height, the counterweight cables enter a stretched state, and the subsea mining vehicle is in a new equilibrium state under the buoyancy, the gravity and a cable tension;
   (2) ejection: a detection system detects data, and determines a direction for the subsea mining vehicle to move in, and the anchors at different positions are determined to be ejected; the control system issues a second instruction to release the anchor cable of a corresponding ejection cavity; the anchor is ejected in the direction to move in under the action of an elastic force, and inserted into soil in the direction to move in to complete the ejection; and the anchor is in a closed state;
   (3) recovery of a part of the counterweights: according to the direction to move in, the counterweight at a corresponding position is recovered;
   (4) recovery of the anchor: the anchor ejected in step (2) is recovered; when the anchor leaves the soil, the built-in electromagnets in the anchor are controlled by the control system to allow the anchor plates to rotate around the anchor shaft to be in an open state; during the recovery of the anchor, due to a reaction force of the anchor pulling out of the soil and a reaction force of water to the anchor in the open state, the subsea mining vehicle generates an initial velocity in the direction to move in; when the anchor reaches the edge of the ejection cavity, the anchor is gradually closed under a constraint of the edge of the ejection cavity; and the anchor compresses the spring under a tension of the anchor cable, and is recovered and fixed in the ejection cavity; and
   (5) recovery of remaining counterweights: the remaining counterweights are recovered while the anchor is recovered; due to the gravity of the subsea mining vehicle greater than the buoyancy, plus the initial velocity generated in step (4) in the direction to move in, the subsea mining vehicle makes an oblique downward motion like a horizontal projectile motion; and the subsea mining vehicle finally leaves the sinking area and falls on a soil layer in the direction to move in, thereby achieving the sinking rescue of the subsea mining vehicle.

6. The use method according to claim 5, wherein in step (2), different anchors are ejected according to different directions for the subsea mining vehicle to move in;
  (A) to move in front, left and right directions: when the soil in front of the sinking area has a satisfactory strength and the subsea mining vehicle is able to run normally in a front area, the subsea mining vehicle is allowed to move forward; the control system issues a third instruction, wherein the front ejection cavity releases the anchor cable; the anchor is ejected to the area in front of the sinking area under the action of an elastic force, and is inserted into the soil in the direction to move in to complete the ejection; and the anchor is in a closed state;
  similarly, when the soil on a left side of the sinking area has a satisfactory strength, the left anchor is ejected; and
  similarly, when the soil on a right side of the sinking area has a satisfactory strength, the right anchor is ejected; and
  (B) to move in front left and front right directions: when the soil on a front left side of the sinking area has a satisfactory strength and the subsea mining vehicle is able to run normally in a front left area, the subsea mining vehicle is allowed to move in the front left direction; the control system issues a fourth instruction, wherein the front and left ejection cavities release the anchor cables; the anchors are respectively ejected to areas in front of and to the left of the sinking area under the action of an elastic force, and are inserted into the soil to complete the ejection; and the anchors are in a closed state; and
  similarly, when the soil on a front right side of the sinking area has a satisfactory strength, the front and right anchors are correspondingly ejected.

7. The use method according to claim 5, wherein in step (3), different counterweights are recovered according to different directions for the subsea mining vehicle to move in;
  (A) to move in front, left and right directions: when the subsea mining vehicle is to move forward, two front counterweights are correspondingly recovered; and when the two front counterweights leave the soil surface, the gravity of a front part of the subsea mining vehicle is increased, and the subsea mining vehicle is tilted forward at a first angle;
  similarly, when the subsea mining vehicle is to move in the left direction, two left counterweights are correspondingly recovered, and the subsea mining vehicle is tilted in the left direction at a second angle; and
  similarly, when the subsea mining vehicle is to move in the right direction, two right counterweights are correspondingly recovered, and the subsea mining vehicle is tilted in the right direction at a third angle; and
  (B) to move in front left and front right directions: when the subsea mining vehicle is to move in the front left direction, front and left counterweights are correspondingly recovered;
  and when the front and left counterweights leave the soil surface, the gravity of a front left part of the subsea mining vehicle is increased, and the subsea mining vehicle is tilted in the front left direction at a fourth angle; and
  similarly, when the subsea mining vehicle is to move in the front right direction, front and right counterweights are correspondingly recovered, and the subsea mining vehicle is tilted in the front right direction at a fifth angle.

8. The use method according to claim 5, wherein the counterweight cable is connected to the counterweight through a hook.

9. The use method according to claim 5, wherein the counterweight is a high-mass pressure-resistant object shaped as a large-bottomed cone.

10. The use method according to claim 5, wherein the counterweight fixing bracket is composed of two semi-ring brackets.

* * * * *